(No Model.)
A. H. MERRIMAN.
ATTACHMENT FOR TYPE WRITING MACHINES.
No. 525,916. Patented Sept. 11, 1894.
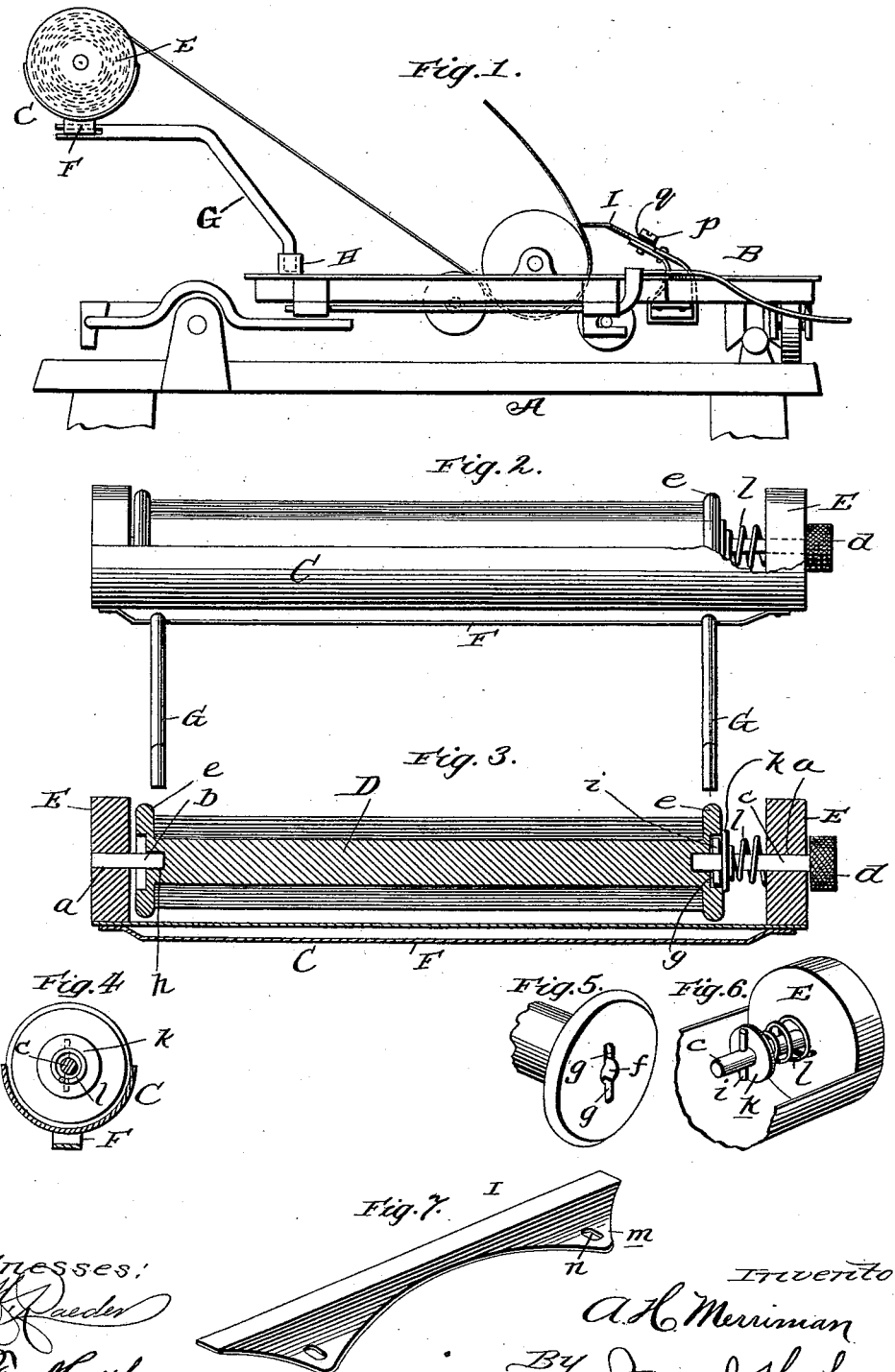

UNITED STATES PATENT OFFICE.

AMASA H. MERRIMAN, OF CHARLES CITY, IOWA.

ATTACHMENT FOR TYPE-WRITING MACHINES.

SPECIFICATION forming part of Letters Patent No. 525,916, dated September 11, 1894.

Application filed April 24, 1894. Serial No. 508,846. (No model.)

*To all whom it may concern:*

Be it known that I, AMASA H. MERRIMAN, a citizen of the United States, residing at Charles City, in the county of Floyd and State of Iowa, have invented certain new and useful Improvements in Type-Writer Attachments; and I do declare the following to be a full, clear, and exact description of the invention, such as will enable others skilled in the art to which it appertains to make and use the same.

This invention has relation to improvements in typewriter attachments, and it has for its prime object to provide a device which can be attached to a Remington or Hammond typewriter, and by slight modifications, can be attached to a Caligraph, or other machine, without additional expense, and which will hold a continuous roll of paper or writing material in a convenient position for use.

A further object of the invention is to adapt the spool or roll holder to be quickly and easily placed in and removed from its bearings or supporting frame.

A further object of the invention is to provide a cheap and simple device for holding the spool or roll under tension, and at the same time assisting in the action of the device for securing the spool.

A further object of the invention is to provide means at a comparatively small expense which can be quickly attached to and removed from the carriage frame for severing or cutting the sheet at desired points.

Other objects and advantages will appear from the following description and claims, when taken in connection with the annexed drawings, in which—

Figure 1, is a side elevation of a part of the frame of a Remington typewriter, showing my improvements applied to the carriage thereof. Fig. 2, is a front elevation of the paper roll holder with the roll in position and the frame partly broken away. Fig. 3, is a longitudinal, central, sectional view of the roll or spool holding frame with the spool or roll therein. Fig. 4, is a cross sectional view of the roll holder frame taken through one of the spool spindles or journals. Fig. 5, is a perspective detail view of the spool. Fig. 6, is a perspective view of one end of the spool or roll holder with parts broken away, and Fig. 7, is a perspective view of the cutter.

Referring by letter to said drawings:—A, indicates a part of the frame of a typewriter, and B, the carriage, the ones here shown, being known as the "Remington" and are illustrated for the purpose of showing the attachment of my improvements. I have simply illustrated such parts of a Remington typewriter, as by showing the application of my improvements to one machine. The manner of attaching them to others, will be obvious. My improvements are adapted to be applied to the Remington, the Hammond, and other machines, in its present form and by slight modifications, can be attached to typewriters of every character.

C, indicates a frame for receiving and supporting a spool D, upon which is suitably wound the writing material. This frame is illustrated as of a trough shape and may be composed of sheet metal or other suitable material having at its opposite end, and on its inner side, heads E, which may be composed of wood or the like, although in some cases metal might be used, and each head is provided centrally with a transverse aperture $a$, for the passage of the spool journals $b$, and $c$. The journal $b$, being preferably fixed and of a less length than the journal $c$, which latter is designed to have a sliding movement within its aperture $a$, and is provided on its outer end with a knob $d$, for the convenient grasp of the operator; the knob being preferably milled so as to facilitate the grasp. On the under side of this trough-shape frame, is a strip F, which is shown as extending nearly the entire length of the frame, although it is obvious that it may be arranged at a distance from each end only for the attachment of arms G, as will be presently described.

The spool or paper holding roll may be composed simply of a rod without heads or flanges at its ends, but as better results can be had with flanges, I prefer to provide the spool with flanges or heads $e$, at opposite ends as shown, and these flanges may be of any suitable dimensions according to the quantity of paper carried by the spool.

The spool is provided on the outer side of one end with a journal aperture $f$, and extending diametrically from this aperture are slots $g$, for a purpose which will presently appear. The opposite end of the spool is provided with a central journal aperture $h$, to receive the journal or stud $b$, so that while the spool turns upon the journal $b$, the rod or journal $c$, will turn with the spool.

The rod $c$, is provided at a suitable distance from its inner end with a cross pin $i$, which enters the slots $g$, of the spool head and back of this pin on said rod is a slidable collar $k$, which is backed by a spring $l$, having a bearing at its opposite end against the adjacent head E, of the roll or spool holding frame. It will thus be seen that by taking hold of the milled head $d$, and pulling it outwardly, the rod or journal $c$, can be withdrawn from the head of the spool, and the roll and spool then taken off of the journal at the opposite end and easily removed from the frame.

To place the spool containing the paper, within the frame, it is simply necessary to first withdraw the rod $c$, then place one end of the spool over the journal rod $b$, and after letting the spool down in the frame, release the rod $c$, so as to enter the aperture and slots in the opposite end, when the spool with its paper will be free to turn in the frame, and the spring which serves to hold the journal rod $c$, in position, will serve the additional function of a tension spring for the roller or spool.

H, indicates the hollow posts which are used on the typewriter carriage to receive the stems of the paper guide at one side of the platen, and in placing my attachment, this paper guide should be removed, and one end of the rods or arms G, placed in the sockets or hollow posts, as shown. These arms G, are slotted at their upper or opposite ends to receive the strip F, on the under side of the trough shape frame, and said arms are bent in an angular manner as shown, so as to sustain the paper roll in a convenient position for use, and to allow the carriage to be swung back in shifting or for other purposes, without interfering with its movements. These arms G, are simply placed in the sockets or hollow posts H, so that they may be free to move laterally, thereby permitting the paper roll to be adjusted with respect to the platen, and furthermore permitting the attachment to be quickly removed and replaced. By having the strip F, as shown, it will be seen that the arms may be slid along to any desired point in its length, so that the device is adapted for attachment to any and all machines.

I, indicates a cutter. This cutter may comprise a blade of suitable material having on its rear edge two short attaching arms $m$, provided with holes $n$, and is designed to be placed on the carriage in front of the printing roll or platen. This cutter is attached to the arms which guide the paper in front of the printing roll by simply removing the screws $p$, on said arms and placing the short arms $m$, on said paper guiding arm so as to have the holes register. The screws are then replaced when the cutter will be secured to the guide as better shown in Fig. 1, of the drawings; a rubber or elastic washer $q$, being preferably interposed between the heads of the screws and the cutter.

As in some cases there is but one paper guiding arm in front of the printing roll it will then be necessary to provide the paper cutter with but a single arm for attachment.

A device of this character will be found very useful for newspaper work and for brief work as well as for many other purposes, and it is obvious that the paper can be put up in any desired quantities and in some cases instead of having a continuous sheet of plain paper, headings may be printed at desired intervals, as the cutter will always be handy to sever the sheet at any desired point.

While I have illustrated the spool as having heads or flanges at opposite ends and described the same as being the preferred construction of spool, yet such reference has been made for the reason that it may be easier to reel the paper upon a spool with heads or flanges but should it be found practicable to omit the flanges, I should for the sake of cheapness in production, prefer to have the flanges omitted, and both ends of the spool might be slotted as at $g$, so as to facilitate the placing of the spool in the reeling machine.

In placing the improvements on a "bar lock" it is simply necessary to slip the arms on the back side of the machine which hold up the paper through the space between the strip and body of the paper holder, so the paper will draw from the top, run it into the machine the same as any other paper. You can swing the arms and move the paper holder so it will feed through into the machine. On top of this is a bar under which the paper passes, as it comes up after being written upon and by bringing the side of this bar to an edge, it can be used as a cutter for the paper.

Having described my invention, what I claim is—

1. The continuous roll paper holder attachment for type writers herein described, consisting essentially, of the trough-shaped frame C, having the heads at its opposite ends provided with apertures $a$, the fixed journal rod $b$, arranged in one of the said apertures $a$, the spool D, having a journal aperture at one end to receive the rod $b$, and also having a journal aperture and slots $g$, at its opposite end, the slidable rod $c$, arranged in one of the apertures $a$, of the frame C, and engaging a journal aperture in one end of the spool and having a stop $i$ adapted to engage the slots $g$, of the spool and also having a head or knob at its outer end, and a coiled spring mounted on the rod $c$, and resting between the stop and the head of the frame C, all substantially as and for the purpose set forth.

2. The herein described typewriter attachment consisting essentially of the trough shaped frame C, having heads at opposite ends provided with apertures $a$, and also having the longitudinal strip F, on its under side, the fixed journal rod $b$, arranged in one of the apertures $a$, of the frame, the slidable rod $c$, arranged in the other aperture $a$, and provided with a stop $i$ and with a head or knob, a spring interposed between the stop of the rod $c$, and one of the heads of the frame C, the spool having a journal aperture at one end to receive the rod $b$, and having a journal aperture and slots at its opposite end to receive the rod $c$, and the stop thereon, and the arms G, having one of their ends slotted or bifurcated to engage the strip F, of the frame C, and having their opposite ends adapted to be placed in the sockets or hollow posts of a type writer carriage, all substantially as specified.

In testimony whereof I affix my signature in presence of two witnesses.

AMASA H. MERRIMAN.

Witnesses:
GEO. S. HANFORD,
JNO. S. BRADLEY.